Patented Mar. 14, 1939

2,150,832

UNITED STATES PATENT OFFICE 2,150,832

MANUFACTURE OF TERTIARY AMINE OF THE DIMETHYL ANILINE TYPE

Walker M. Hinman, Winnetka, and Walter G. Hollmann, Chicago, Ill., assignors to The Frederick Post Company, Chicago, Ill., a corporation of Illinois No Drawing. Application February 8, 1937, Serial No. 124,664

31 Claims. (Cl. 260—577)

The present invention relates to the manufacture of tertiary amines, in which there are two similar organic radicals, and an aromatic radicle. The invention relates particularly to use of a primary aromatic amine as a basic raw material, and to the treatment thereof with an organic halide under conditions to replace the two hydrogens of the primary amine with two of the organic radicles from the halide.

The invention is particularly useful where the duplicate organic radicals desired are of higher molecular weight than the methyl and ethyl radicles. For tertiary amines such as dimethyl aniline and diethyl aniline, there are satisfactory methods of manufacture which are not satisfactorily adaptable or workable for higher alkyl, aryl, aralkyl, and other heavy radicles.

The fundamental reaction employed in the present invention is not new and has been proposed for some of the materials useful in the present invention. But the usual manner of carrying out the fundamental reaction is such that the process is impracticable or inoperable for many materials. The present invention involves new methods of procedure to aid the progress of the fundamental reaction whereby it becomes more universally useful and permits simple manufacture of a large number of tertiary amines.

Aniline is the simplest form of the aromatic primary amines, and taking it as a starting base, there may be one or more additional substituents in the benzene or other aromatic ring, such as the methyl type group and its homologs, the methoxy type group and its homologs, the nitro group, the halogens, the aldehyde, the ketonic type group such as in amino-acetophenones, and other substituents. The invention is furthermore not limited to reactions involving mononuclear aromatic amines, for it may be used with reactions involving polynuclear compounds and their derivatives, such as naphthylamines, aminodiphenyls, etc. The organic halide may be a chloride, or a bromide. The organic radicle may be a hydrocarbon radical which is aliphatic, aromatic, mixed, straight-chain, or cyclic.

The fundamental reaction involved is well known and may be represented by designating the primary amine as RNH₂, and the organic halide as XG, wherein R represents the aromatic radicle of the primary amine, X the organic radicle of the halide, and G the particular halogen.

The total reaction is (1) 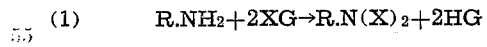

The materials are reacted together with heat, and pressure if required. The resulting HG may be hydrochloric acid or hydrobromic acid. Because any such acid is formed in the presence of unreacted amine, the two combine to form R.NH₂.HG, thus removing from reactivity a quantity of primary amine, usually as a solid. The reaction, however, does not actually go smoothly as indicated above. It apparently takes place in stages which may be represented as follows:

(2) 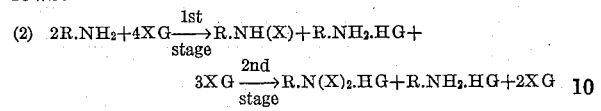

This is indicated by the fact that there can be found at one time the primary amine, secondary amine and tertiary amine. The second stage seems to take place much slower than the first, and even days or weeks may be required for some materials to proceed as far as indicated above. And then it will be found that only half of the amine will be converted as desired, and that half of the organic halide remains.

This difficulty has been encountered heretofore in the prior art and has been avoided by separating the ingredients by distillation. The earlier the reaction is stopped, the more complicated is the mixture. The later it is stopped the greater is the loss of time, and in no case does it go to completion. The incompletely reacted mass has been distilled to remove organic halide. The still residue has been cooled and mixed with a cold solution of alkali such as sodium hydroxide to break up the amine hydrohalide salts (≡N.HG), forming, in the example, sodium halide, and releasing the various amines as free bases in the oily layer, separable from the water layer containing the alkali halide. The oily layer has been dried and the oil fractionally distilled to separate the individual amines. A small yield of the tertiary amine could thus be obtained. Some secondary amine so obtained could be reacted with the organic halide to repeat the second stage of the reaction. At best, a 50% yield of the tertiary amine from the aniline could be expected as the theoretical maximum with much procedure and at great expense in time and labor.

The present invention aims to improve the above fundamental reaction to secure a 100% possible yield of the tertiary amine from the aniline, in less time, and without any of the several distillations referred to. One object of the invention is to carry out the reaction in one, two, or more simple steps, without distillation, and neutralizing and removing the hydrohalogen acid either during the reaction or after each step, while maintaining in the mass all the original reactants and their amine products.

Another object of the invention is the use of a solvent to promote the speed of the reaction, and to facilitate the neutralization procedure.

Still another object of the invention is to promote the progress of the reaction by the use of an amine as a neutralizing agent, and preferably by use of the desired tertiary amine, with or without the use of the solvent.

Various other and ancillary objects and advantages of the invention will appear from the following description and explanation of the invention and the examples, showing how the same may be carried out in practice.

Referring to a specific case for the purpose of aiding in the explanation, it is assumed that n-hexyl aniline is desired. This has the formula —$C_6H_5.N(C_6H_{13})_2$—. Two molecular weights of an n-hexyl halide, preferably n-hexyl bromide —$C_6H_{13}Br$—, are employed for each molar weight of aniline—$C_6H_5.NH_2$—. These are placed in a vessel to be heated, and if open it may be equipped with a reflux condenser for condensing and returning material vaporized in the heating. The material will begin to boil at about 160° C. The heat is applied for several hours during which the first stage of the reaction proceeds as indicated by reaction (2) above, forming aniline hydrobromide—$C_6H_5.NH_2.HBr$—as a solid which usually grows into a cake or crush on the walls of the vessel. According to prior art practice this reaction may be continued from hours to days and days, or the mass may be distilled, alkalized, separated and fractionally distilled as above described. In either event 50% yield from the aniline is the highest goal attainable.

Experiments to shorten the procedure and increase the yield have lead to the present invention. It was first proposed to add solid alkalies, such as sodium hydroxide, or anhydrous sodium carbonate, to the reaction mass, with a view to releasing the aniline which is otherwise tied up with the hydrobromic acid, thereby converting the latter to sodium bromide. But the alkalies so used at elevated temperature easily break down the hexyl bromide, and other organic halides which have been similarly tried, faster than the desired reaction takes place.

With the same objective, it was found successful to cool the reaction mass, then to add a solution of alkali, such as a 10% solution of sodium hyodroxide, without distilling off the hexyl bromide. Avoidance of excess alkali is generally indicated and is effected by slow addition of the solution with sufficient agitation to mix the two phases. Preferably, the mixture is made just alkaline by controlling the addition of the alkali solution. The solid aniline hydrobromide reacts with the alkali and disappears forming aniline oil, sodium bromide, and water. This is continued until all the aniline hydrobromide is used up. A measurement of the alkali so consumed indicates the extent to which the main reaction has progressed. The cautious treatment and lower temperature practically avoid hydrolysis of the hexyl bromide. The mixture separates into two layers upon standing. Then the oil layer is removed from the water layer and dried over an agent such as lumps of calcium chloride. The dried solution containing the residual aniline and hexyl bromide, and the formed hexylated aniline are again refluxed for another period. The alkalization steps may be repeated for one or more times, and soon the first and second stages of the reaction will be passed, and a third stage is entered, which is new according to this invention. This comprises further reacting the alkalized mixture, and this may be accomplished because the amine hydrohalides have been broken up and the hydrohalogenic acid is shifted to a combination with inorganic alkali, thus setting free the amine bases for further function.

Experience with many reactions of the prior art type, on various materials, shows that the second stage is invariably much slower than the first stage, and that some reactions are slower by days than others. The slower a reaction appears to be, the more often the alkalization of this invention may be carried out. The time and labor consumed in the treatment are more than repaid by shortening the total time required, and by the additional yield at any given time. For example, in one case a reaction was completed in two 24-hour periods of refluxing with one intermediate alkalization. The same process may be completed sooner, using three or four 7-hour to 8-hour reflux periods.

The foregoing establishes the first step in improvement, but it also leaves difficulties to be overcome. One of these is the solid cake of aniline hydrobromide or other amine-halide. On cooling the reaction mass more of this cakes out to a very hard solid, sometimes of stone-like hardness, having an aggregate of crystals. This is attacked slowly by the alkali solution, and hence there is an additional delay in this neutralizing treatment. To overcome this condition, a solvent or diluent may be added to the reaction mass. Many organic solvents are available which will not react at all or appreciably with the essential ingredients encountered. Choice of solvent may be dictated by the manner of separating it from the end product, or of extracting the desired tertiary amine from the mass, or by the question of cost or waste of the solvent. Excess of the organic halide may act as a solvent. In principle, non-reactive solvents may be used, such as hydrocarbons, ketones, mono or polyhydric alcohols, high-boiling ethers, and the like. Halogen derivatives of such solvents are to be avoided in principle, but an excess of the reactive halide may be considered as a solvent, and a tertiary amine may be considered as a solvent, even though it is reactive.

The preferred solvent is an organic alcohol with the same organic radicle as the halide employed. Thus, for n-hexyl bromide (XBr), n-hexyl alcohol (XOH) is used. This is preferred in part because like dissolves like, and in part because the organic alcohol residue may contain residual organic halide, and the mixture may be treated to convert the alcohol to halide, or it may be reused when reinforced with more organic halide. These are only collateral economies, but they are of great practical importance. The choice of the organic alcohol assures less contamination of the desired tertiary amine by some organic substance of different composition as to the organic radicle.

It was found that use of solvent largely inhibits the separation of amine-hydrohalide in the refluxing apparatus, and prevents its caking out on cooling. Thus the alkalization time is greatly shortened. It was also found that the solvent speeded the refluxing reaction. In one case where solvent was not employed two 24-hour periods were required, but where the corresponding alcohol solvent was used, the reaction could be practically completed in two 6-hour to 7-hour refluxing periods.

Observation on unalkalized refluxing of the prior art showed that the second stage of the reaction is slower than the first stage. But when the above-described alkalization was carried out, it was observed as a general rule, that the reaction proceeded more rapidly after alkalization than before the first alkalization. This was followed easily by measurement of alkali consumed to remove hydrohalide. It was discovered that by adding at the beginning, some of the tertiary amine which is the objective of the process, the reaction was still further accelerated. This appears contrary to the law of mass action, which dictates that the initial presence of an excess of an end product retards the progress of a reaction to produce that product.

The effect of an initial quantity of the desired tertiary amine may be accomplished both with and without the use of solvent. In one case where tertiary amine was used in 1 molar quantity for 1 molar quantity of aniline (in other words as much tertiary amine was added initially as it was possible to make in the process), the complete reaction was carried out in one 3-hour refluxing, without an intermediate alkalization, compared to two 24-hour reflux periods with alkalization, or three to four 7-hour to 8-hour reflux periods with solvent and with alkalization.

This discovery reverts to the original idea of adding basic materials to the reaction as a neutralizing agent. The first attempt to accomplish this failed through choice of too strong an alkali which caused decomposition of the reacting ingredients. Tertiary amines are stronger basic materials than primary amines. There are other organic bases such as pyridine, quinoline, and other tertiary amines, such as dimethylaniline, but the use of these is not ordinarily desirable because of the question of contamination. Where the amine thus employed as a basic material is the tertiary amine to be made by the process, it is obviously the preferred one.

Thus the invention in its broadest aspect is the use of a basic material somewhere in the reaction to unite with and remove the hydrohalide formed by the reaction, which hydrohalide retards the reaction by taking up with the primary amine. This basic material must be more basic than the primary amine. Where the basic agent is an amine, there is not sufficient basicity to hydrolyze the organic halide appreciably at the reacting temperature, so that the amine, to function as basic material, may be present during the reaction. Where the basic material is of such stronger basicity such as the mineral oxides or hydroxides and alkali metal carbonates, as to hydrolyze the organic halides appreciably at the temperature of the reaction, and not at lower temperatures, the cooling and the intermediate alkalization may be performed, as above described.

The hydrolysis of a number of organic halides has been studied by contact of a 10% caustic soda solution with the halide for about 30 days, with occasional shaking from day to day as the test bottle stands on the laboratory bench. The following table gives the percent of hydrolysis.

|  | Per cent |
|---|---|
| Mixed amyl chlorides (1% tertiary) | .58 |
| n-hexyl bromide | .93 |
| n-propyl bromide | 1.75 |
| Amyl bromides (primary isomers from refined fusel oil) | 3.00 |
| n-butyl bromide | 5.00 |
| Ethyl bromide | 10.00 |
| Tertiary amyl chloride | 19.50 |
| Benzyl bromide | 6.00 |
| Cyclohexyl bromide | 0.00 |
| n-amyl iodide | 0.00 |
| Lauryl bromide (mixed isomers) | .60 |
| Benzyl chloride | 7.80 |
| Octyl bromide (2 ethyl-hexyl bromide) | 0.00 |

Where the free tertiary amine is desired, the alkalization of course may usually be required at the end of the reaction, especially where the initial excess of tertiary amine is employed, and where the intervening alkalization is omitted. This is because the hydrohalogenic acid formed is usually tied up with the desired tertiary amine, and to obtain the initial quantity and the formed quantity, the hydrohalide must be broken up. This hydrohalide of the tertiary amine also forms lumps or cake, which may even be harder than the hydrohalide of the primary amine. Therefore, to facilitate the final treatment, or any intermediate alkalization, the use of a solvent is preferred for its solvent function. The effect of the solvent to speed the reaction is greatly overcome or masked by the greater acceleration produced in adding an initial quantity of the tertiary amine. In such case the solvent is still preferred to be the organic alcohol corresponding to the organic halide, for the reasons above discussed.

Where the tertiary amine used for neutralization exceeds the quantity of hydrohalogenic acid formed, all or a large part of the desired tertiary amine may be left as the free base. These are instances where a solvent may be so chosen and used in the process that either a solid and a liquid phase are formed, or two separable liquid layers result, either during the heating or on cooling, or at both times. In a liquid phase some or all of the free desired tertiary amine may be selectively concentrated, with the hydrohalide of the neutralizing amine largely in the other layer, or in the solid phase. Where more than two mols of neutralizing tertiary amine is present per mole of primary amine for which two mols of organic halide are used, the amine hydrohalide tends to remain in a liquid layer in distinction from its tendency to form a solid layer. These features are illustrated below in Example 9. This example also illustrates the use of lower temperatures than in cases where only higher boiling material or solvent is employed.

The sodium bromide or other halide need not be wasted. It may be dried to a solid salt, and used with sulphuric acid and an organic alcohol, or the residual mixture of organic alcohol and like organic halide, to convert the alcohol into the halide for further preparations.

The final oily layer obtained after final alkalization, containing the tertiary amine (with or without the initial excess), any residual primary or secondary amine, any residual organic halide, and any solvent, is dried, as over calcium chloride, and distilled or otherwise treated in any suitable manner to recover the desired tertiary amine. The procedure will vary according to the particular compounds involved, and will be readily determined by anyone skilled in the art. The extent to which the tertiary amine need be purified will of course depend upon the uses to which it may be put. In the dyestuffs industry for example, some uses may require highly purified tertiary amine, or may permit considerable impurities therein, or may even employ the hard cake of tertiary amine hydrohalide, especially the hydrochloride.

The reaction may be carried out with a variety of alkyl halides, such as methyl, ethyl, propyl, butyl, amyl, hexyl, heptyl, octyl, and up to lauryl, and even longer hydrocarbon chains. It has been found that a pure isomer or mixed isomers may be employed as desired. For example a so-called "propyl" radicle may signify either a normal propyl chain CH₃—CH₂—CH₂— or the iso-propyl chain

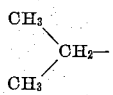

both having the empirical formula C₃H₇—, as the "propyl" radicle. So, throughout the specification and claims, the mention of any particular radicle signifies a pure isomer, or mixed isomers. So far as the present invention is concerned, the operation of the process is not affected materially, and if it is affected at all, it is affected in degree only, by change in the radicle of the organic halide, or by change in the character of the aromatic group of the primary amine, or by both, or by other obvious structural changes. For example pure tertiary amyl chloride is far less reactive than the mixed isomers, as derived from fusel oil. In other words, the invention applies as an improvement in procedure for those specific reactions which can proceed according to reaction (1) above.

Where the term "halide" is used it contemplates broadly chloride and bromide with the introspection into these uses which is normally possessed by organic chemists. Fluorides are uncommonly used, and in the particular reaction where hydrofluoric acid is generated, it would be corrosive of glass if such were used as the apparatus. Fluorides are avoided as unduly poisonous and difficult to handle. Iodides are avoided if bromides and chlorides may be substituted, largely on account of expense, and also because they work less smoothly. Bromides are most commonly used and possess greater reactivity than chlorides. Chlorides are of course cheaper, and more available in some instances, while bromides are more available in other cases. Frequently, chlorides are more volatile than bromides, and hence the use of a bromide in preference to a chloride, may permit the reaction to occur in open reflux apparatus, rather than in a pressure autoclave. Where the term "refluxing" has been used herein, it is to be understood to be used loosely, as a laboratory term, defining the use of heat with conservation of volatile matter, whether in the well known refluxing apparatus or an autoclave under pressure. In the course of experiments with chlorides, bromides and iodides it has been found as general rules that the bromides are preferred for open reflux conditions; that such conditions are not so favorable to the use of chlorides; that pressure autoclaves may be desirable for practical results with chlorides; that iodides are too expensive and involve too much expense to prepare the organic iodides; that the lower practical temperatures are preferred to higher ones in order to lessen the hazard, expense, decomposition, and formation of by-products through side reactions.

The foregoing are only general rules and are subject to exceptions, depending upon what organic radicle is used for the halide, or what primary amine is employed.

The following examples illustrate a large number of variations in the process as to procedure and material. In the examples the parts are to be understood as by weight, and for convenient laboratory apparatus, as grams; 93 parts of aniline is one gram mol.

Example 1

Aniline (93 parts), ethyl bromide (272 parts), and anhydrous ethyl alcohol (90 parts), are placed in a vessel with a reflux condenser exposed through a drying tube to atmospheric pressure, and heated. After 20 hours, the mass is cooled to room temperature. Some solid appears therein. A 10% water solution of sodium hydroxide is added slowly with agitation, and as the alkali disappears more solution is added, until the mass ceases to consume alkali. For example about 1.18 gram mols of alkali may be so used. The mass is then treated to separate the oil and water layers. The oil layer is dried over calcium chloride and the dried material is refluxed again for 24 hours. The alkalization of the cooled mass is repeated in the same way. About 1.07 gram mols of alkali may be used on the second treatment. The alkali indicates roughly the amount of hydrobromic acid formed. The total of 2.25 mols is more than the theoretical 2 mols. The excess includes experimental error, such as over-running of the alkali, and also some slight excess caused by a minor hydrolysis of the 2½ gram mols of the ethyl bromide employed, either in the reflux period or in the neutralization. Aniline is practically absent. The disappearance of the aniline and the amount of alkali used show a practically complete conversion to diethyl aniline. This material is an oil left after the removal of the water layer. It may be purified by well known procedure.

The above procedure applies generally to the following examples and is arranged in tabular form by which subsequent examples are presented for convenience. In this example two reflux "periods" of 20 and 24 hours were used. In other examples more periods, and longer and shorter periods will appear. These are arbitrary as indicated in the foregoing description, and are merely given because they have actually been employed in development tests. The periods do not indicate that the given hours were required to produce the change shown. Earlier alkalization is recommended.

Tabulated data

Explanation: In the examples given below, the expression after the word "Period", such as "20 hours 1.18 mols" signify that after reacting the materials as described in Example 1 above, and titrating with 10% sodium hydroxide solution, the given "mols" of NaOH were required to neutralize hydrohalogen acid formed in the reacting period. The number of such expressions indicates the number of reacting periods. For detailed disclosure of the procedure see Example 1 above.

Example 1 (in condensed form)

1 mol aniline, 2.5 mols ethyl bromide, 1.5 mols anhydrous ethyl alcohol. Period: 20 hours 1.18 mols; 24 hours 1.07 mols. Product: diethyl aniline.

Example 2

1 mol aniline, 2.5 mols normal propyl bromide, 1.5 mols normal propyl alcohol. Period: 22 hours 1.08 mols; 25 hours .848 mol. Product: di-n-propyl aniline. B. P. 126°–127° C. at 20 mm.

Example 3

1 mol aniline, 2.5 mols isopropyl bromide, 1.5 mols isopropyl alcohol. Period: 20 hours 1.03 mols; 24 hours .266 mol; 21 hours .140 mol; 21 hours .140 mol; 21 hours .035 mol; 92 hours .414 mol. Product: di-isopropyl aniline. B. P. 110°–115° C. at 20 mm.

Example 4

1 mol aniline, 2.5 mols normal butyl bromide, 1.5 mols normal butyl alcohol. Period: 20 hours 1.08 mols; 24 hours 1.049 mols. Product: di-n-butyl aniline. B. P. 145°–147° C. at 20 mm.

Example 5

1 mol aniline, 2.5 mols amyl bromide (from fusel oil), 1.5 mols amyl alcohol (from fusel oil). Period: 8 hours 1.07 mols; 8 hours .96 mol. Product: diamyl aniline. B. P. 150°–155° C. at 20 mm.

Example 6

1 mol aniline, 2.5 mols normal hexyl bromide, 1.5 mols normal hexyl alcohol. Period: 20 hours 1.0 mol; 21 hours .37 mol; 21 hours .27 mol; 21 hours .43 mol. Product: di-n-hexyl aniline. B. P. 175°–180° C. at 20 mm.

Example 7

1 mol aniline, 2.5 mols octyl bromide, 1.5 mols octyl alcohol. Period: 21 hours 1.4 mols; 9 hours .62 mol; 14 hours .39 mol. Product: di-octyl-aniline. B. P. 185°–190° C. at 20 mm.

Example 8

1 mol aniline, 2.5 mols lauryl (12 carbon) bromide, 1.5 mols lauryl alcohol. Period: 9 hours 1.02 mols; .25 hour .48 mol; 1 hour .40 mol; 1 hour .15 mol. Product dilauryl aniline. B. P. 200°–300° C. at 20 mm.

The foregoing examples are a series performed for alkylation which show that the number of carbon atoms and the arrangement of them in the chain do not affect the procedure except in degree when bromides are used with aniline. It has also been established that chlorides and iodides may be used. Other series have been performed showing that various substituents may be used in the ring of the aniline, and that other and polynuclear aromatic amines may be employed. Not only may straight-chain alkyl radicals be introduced but also cyclic alkyl radicles, and aralkyl groups.

The foregoing series also demonstrates in each instance the use of a solvent, but this may be dispensed with as earlier discussed. The use of amine for neutralizing the hydrohalogenic acid may be resorted to for eliminating the intermediate alkalization.

All of these and various other features are demonstrated in the following unclassified examples.

Example 9

1 mol aniline, 2.5 mols benzyl bromide, 5 mols dimethyl aniline, and 5 mols di-isopropyl ether. This forms and maintains two layers throughout the process. The mixture refluxes at about 70° C., which is about the boiling point of the upper layer of di-isopropyl ether. When refluxed for 16 hours, and cooled, the upper layer is separated and evaporated to dryness, leaving directly a 25% yield of solid dibenzyl aniline, meeting sharply at 69° C. This may be further purified by washing with ethyl alcohol in which it has slight solubility. The lower layer may be treated to isolate the amines remaining therein, as described in other examples.

Example 10

1 mol aniline, 2.5 mols mixed amyl chlorides, 1.5 mols mixed amyl alcohols, 1 mol diamyl-aniline. Period: 21 hours .725 mol; 21 hours .438 mol; 21 hours .159 mol; 21 hours .230 mol; 92 hours .28 mol; 18 hours .256 mol. Product: diamyl aniline (also diamyl-amino-benzene). B. P. 175°–178° C. at 20 mm.

Example 11

1 mol aniline, 2.5 mols cyclohexyl bromide, 1.5 mols cyclohexanol. Period: 17 hours 1.10 mols; 20 hours .85 mol; 24 hours .14 mol. Product: di-cyclohexyl aniline (also phenyl di-cyclohexyl-amine). B. P. 175°–177° C. at 20 mm. Melting point slightly above room temperature.

Example 12

1 mol ortho-chlor-aniline, 2.5 mols amyl bromide (fusel), 1.5 mols amyl alcohol (fusel). Period: 21 hours .76 mol; 21 hours .51 mol; 21 hours .21 mol; 20 hours .21 mol; 24 hours .14 mol; 28 hours .15 mol. Product: ortho-chloro-diamyl aniline. B. P. 160°–170° C. at 20 mm.

Example 13

1 mol ortho-phenetidine, 2.5 mols amyl bromide, 1.5 mols amyl alcohol. Period: 21 hours 1 mol; 21 hours 1 mol; 21 hours .05 mol. Product: ortho-ethoxy diamyl aniline. B. P. 174°–177° C. at 20 mm.

Example 14

1 mol para-nitraniline, 3.34 mol benzyl chloride, 2 mols benzyl alcohol. Period: 14 hours .62 mol; 21 hours .16 mol; 92 hours .44 mol; 18 hours .48 mol. Product: paranitro-dibenzyl aniline. Purified by steam distillation.

Example 15

1 mol 2-chloro-4-nitro-aniline, 2.5 mols amyl bromide, 1.5 mols amyl alcohol. Period: 21 hours .51 mol; 21 hours .56 mol; 92 hours 1.01 mols. Product: 4-nitro-2-chloro-phenyldiamylamine. Purified by steam distillation.

Example 16

1 mol aniline, 4.3 mols amyl bromide. Period: 7 hours .56 mol; 7 hours .95 mol; 7 hours .46 mol; 7 hours .03 mol. Product: diamyl aniline.

Example 17

1 mol alpha naphthylamine, 2.5 mols amyl bromide, 1.5 mols amyl alcohol. Period: 25 hours 1. mol; 22 hours .94 mol. Product: diamyl alpha naphthylamine. B. P. 190°–210° C. at 20 mm.

Example 18

1 mol para amino diphenyl, 2.5 mols amyl bromide, 1.5 mols amyl alcohol. Period: .50 hour .53 mol (added 18 mols more of amyl alcohol as solvent as it formed a solid); 22 hours 1.38 mols. Product: 4-diamyl amino diphenyl. B. P. 245°–250° C. at 20 mm.

Example 19

1 mol aniline, 2.5 mols cyclohexyl bromide, 1 mol dimethyl aniline, 1.5 mols xylene. Period: 1st. .533 mol; 2nd 1.44 mols; 3rd .012 mol. Product: dicyclohexyl aniline. B. P. 175°–180° at 20 mm.

From the foregoing it is to be understood that the variations disclosed, and others may be used singly or in various combinations without departing from the spirit and scope of the invention as defined in the appended claims.

We claim:

1. The improved method of making a tertiary amine by condensation of a primary aromatic amine and a hydrocarbon halide having the halogen attached to an aliphatic carbon atom, wherein two hydrocarbon radicles replace the two amino hydrogens of the primary amine and wherein hydrohalogenic acid is formed, which comprises subjecting said materials to reaction in a mass while preventing the formed hydrohalogenic acid from interfering with the reacting ingredients and the reaction products by the addition to the reacting mass of a tertiary amine which is more basic than the primary amine, whereby the added amine combines with the hydrohalogenic acid formed by the said reacting ingredients and leaves the primary amine free for further reaction.

2. The improved method of making a tertiary amine by condensation of a primary aromatic amine and a hydrocarbon halide having the halogen attached to an aliphatic carbon atom, wherein two hydrocarbon radicles replace the two amino hydrogens of the primary amine and wherein hydrohalogenic acid is formed, which comprises subjecting said materials to reaction in a mass while preventing the formed hydrohalogenic acid from interfering with the reacting ingredients and the intermediate reaction products by the addition to the mass of a quantity of the desired tertiary amine, whereby the added amine combines with the hydrohalogenic acid and leaves the primary amine free for further reaction.

3. The improved method of making a tertiary amine by condensation of a primary aromatic amine and a hydrocarbon halide having the halogen attached to an aliphatic carbon atom wherein two hydrocarbon radicals replace the two amino hydrogens of the primary amine and wherein hydrohalogenic acid is formed, which comprises subjecting said materials to reaction in a mass while preventing the formed hydrohalogenic acid from interfering with the reacting ingredients and the reaction products by the addition of one molar part of a tertiary amine which is more basic than the primary amine, for each molar part of the primary amine for which there is present two molar parts of the hydrocarbon halide.

4. The improved method of making a tertiary amine by condensation of a primary aromatic amine and a hydrocarbon halide having the halogen attached to the aliphatic carbon atom, wherein two hydrocarbon radicles replace the two amino hydrogens of the primary amine and wherein hydrohalogenic acid is formed, which comprises preventing the formed hydrohalogenic acid from interfering with the reacting ingredients and the reaction products by the addition of one molar part of the desired tertiary amine for each molar part of the primary amine for which there is present two molar parts of the halide.

5. The improved method of making a tertiary amine by condensation of a primary aromatic amine and a hydrocarbon halide having the halogen attached to an aliphatic carbon atom, wherein two hydrocarbon radicles replace the two amino hydrogens of the primary amine and wherein hydrohalogenic acid is formed, which comprises the addition to the condensation of an alcohol as solvent which is inert in the process having the same hydrocarbon radicle as the halide employed, said solvent serving to minimize formation of a hard solid or cake of amine-hydrohalide, and to hasten the rate of condensation, and neutralizing the mass so formed by an alkaline solution, the form of the amine hydrohalide being such as to facilitate the neutralization as compared to the same procedure when the solvent alcohol is omitted, the contact with alkali being limited to the time necessary to effect the neutralization of accumulated amine hydrohalide.

6. The improved method of making a tertiary amine by condensation of a primary aromatic amine and a hydrocarbon halide having the halogen attached to an aliphatic carbon atom, wherein two hydrocarbon radicles replace the two amino hydrogens of the primary amine and wherein hydrohalogenic acid is formed, which comprises subjecting said materials to reaction in a mass with the addition to the condensation of a solvent which is inert in the process, and the addition to the condensation of a tertiary amine which is more basic than the primary amine, the added amine serving during the reaction to take up the hydrohalogenic acid and leave the unreacted portion of the primary amine free for continuation of the condensation, and the solvent serving to minimize the formation of a solid form of amine-hydrohalide, and to accelerate the rate of condensation.

7. The improved method of making a tertiary amine by condensation of a primary aromatic amine and a hydrocarbon halide having the halogen attached to an aliphatic carbon atom, wherein two hydrocarbon radicles replace the two amino hydrogens of the primary amine and wherein hydrohalogenic acid is formed, which comprises the addition to the condensation of an alcohol as solvent which is inert in the process, having the same hydrocarbon radicle as the halide employed, and the addition to the condensation of the desired tertiary amine as a neutralizing agent to take up the hydrohalogenic acid and leave primary amine free for the condensation, said solvent serving to minimize formation of a solid form of amine hydrohalide.

8. The process of making tertiary amine which comprises reacting a primary aromatic amine with a hydrocarbon halide having the halogen attached to an aliphatic carbon atom, in the presence of an added quantity of the tertiary amine resulting from the reaction.

9. The process of making a tertiary amine which comprises reacting a molar quantity of a primary aromatic amine with at least about two molar quantities of a hydrocarbon halide having the halogen attached to an aliphatic carbon atom, in the presence of about a molar quantity of the desired tertiary amine as an agent to combine with the initially produced quantity of hydrohalogenic acid, whereby to relieve the residual primary amine or the secondary amino product thereof for condensation with hydrocarbon halide.

10. The improved procedure for carrying out a reaction which forms a tertiary amine by a relatively slow condensation of one mol of a primary aromatic amine with two mols of a hydrocarbon halide having the halogen attached to an aliphatic carbon atom, in which condensation of two hydrocarbon radicles replace the two amino hydrogens of the primary amine with the resulting formation of hydrohalogenic acid which comprises subjecting said materials to reaction in a mass, interrupting the condensation one or more times, and at each time applying to the reacting mass a solution of a neutralizing inorganic alkali for the hydrohalogenic acid to form an inorganic halide salt in solution, separating the solution from the reacting ingredients, and continuing the reaction, whereby each removal of formed acid hastens the reaction toward completion and renders all of the primary amine available for the condensation.

11. The process of claim 10 in which an inert solvent material for the primary amine and the halide is present during the condensation whereby the formation of solid amine hydrohalide is such as to facilitate its availability for quick neutralization, and whereby the solvent acts during the condensation to accelerate the condensation.

12. The process of claim 10 in which inert solvent selected from the group consisting of intert hydrocarbons, inert ketones, inert mono and polyhydric alcohols, inert high boiling ethers, excess of the reactive hydrocarbon halide, and neutralizing tertiary amine, is present during the condensation whereby to accelerate the condensation, and whereby to render the formed amine hydrohalide subject more quickly to neutralization by said alkali solution.

13. The process according to claim 10 in which a neutralizing tertiary amine is present during the condensation whereby to unite with the hydrohalogen acid and thus free the primary amine and intermediate monosubstituted amine for the condensation.

14. The process according to claim 10 in which tertiary amine of the kind to be formed by the condensation is added to be present during the condensation to accelerate the reaction.

15. The process according to claim 10 in which an alcohol of the same hydrocarbon as the halide is present as a solvent during the condensation to accelerate the condensation.

16. The process according to claim 10 in which during the condensation an alcohol of the same hydrocarbon as the halide is present as a solvent, and a tertiary amine of the kind to be formed by the condensation is present, both to accelerate the condensation.

17. The improved method of making a tertiary amine by condensation of a primary amine of the group consisting of phenyl-, naphthyl- and diphenyl-amines, and a hydrocarbon halide of the group consisting of alkyl-, benzyl- and cyclohexyl-halides, in which condensation two hydrocarbon radicals from the hydrocarbon halide replace the two amino hydrogens of the primary amine with the resulting formation of hydrohalogenic acid, which comprises subjecting said materials to reaction in a mass in the presence of a tertiary amine of the group consisting of tertiary heterocylic amines and amines of the formula

wherein R is a member of the group consisting of phenyl, naphthyl, and diphenyl groups and $R_2$ and $R_3$ are members of the group consisting of alkyl, benzyl and cyclohexyl groups, said tertiary amine serving during the reaction to combine with the formed hydrohalogenic acid and leave free an unreacted portion of the primary amine for continuation of the reaction towards completion.

18. The improved method of making a tertiary amine by condensation of a primary amine of the group consisting of phenyl-, naphthyl- and diphenyl-amines, and a hydrocarbon halide of the group consisting of alkyl-, benzyl- and cyclohexyl-halides, in which condensation two hydrocarbon radicals from the hydrocarbon halide replace the two amino hydrogens of the primary amine with the resulting formation of hydrohalogenic acid, which comprises subjecting said materials to reaction in a mass in the presence of an added amount of the desired tertiary amine, said added amine serving during the reaction to combine with the formed hydrohalogenic acid and leave free an unreacted portion of the primary amine for continuation of the condensation.

19. The process of claim 17 in which the said tertiary amine is used in the proportion of one molar part to each molar part of the primary amine for which there is present two molar parts of the hydrocarbon halide.

20. The improved method of making a tertiary amine by condensation of a primary amine of the group consisting of phenyl-, naphthyl- and diphenyl-amines, and a hydrocarbon halide of the group consisting of alkyl-, benzyl- and cyclohexyl-halides, in which condensation two hydrocarbon radicals from the hydrocarbon halide replace the two amino hydrogens of the primary amine with the resulting formation of hydrohalogenic acid, which comprises subjecting said materials to reaction in a mass in the presence of an added amount of the desired tertiary amine in the proportion of one molar part for each molar part of the primary amine for which there is present two molar parts of the hydrocarbon halide, the added tertiary amine serving during the reaction to combine with the formed hydrohalogenic acid and leave free the unreacted portion of the primary amine for continuation of the condensation.

21. The improved method of making a tertiary amine by condensation of a primary amine of the group consisting of phenyl-, naphthyl- and diphenyl-amines, and a hydrocarbon halide of the group consisting of alkyl-, benzyl- and cyclohexyl-halides, in which condensation two hydrocarbon radicals from the hydrocarbon halide replace the two amino hydrogens of the primary amine with the resulting formation of hydrohalogenic acid, which comprises subjecting said materials to reaction in a mass in the presence of an added solvent agent which is an alcohol inert in the process and which has the same hydrocarbon radical as the halide employed, said solvent serving to minimize the formation of a hard solid or cake of amine-hydrohalide during the reaction, and also to hasten the rate of condensation, and neutralizing the reaction mass so formed with an alkaline solution, the form of the amine-hydrohalide being such as to facilitate the neutralization as compared to the same procedure when the solvent alcohol is omitted, the contact with alkali solution being limited to the time necessary to effect the neutralization of the accumulated amine-hydrohalide.

22. The improved method of making a tertiary amine by condensation of a primary amine of the group consisting of phenyl-, naphthyl- and diphenyl-amines, and a hydrocarbon halide of the group consisting of alkyl-, benzyl- and cyclohexyl-halides, in which condensation two hydrocarbon radicals from the hydrocarbon halide replace the two animo hydrogens of the primary amine with the resulting formation of hydrohalogenic acid, which comprises subjecting said materials to reaction in a mass in the presence of an additional agent which is a solvent inert in the process and further in the presence of an additional tertiary amine of the group consisting of tertiary heterocylic amines and amines of the formula

wherein R is a member of the group consisting of phenyl, naphthyl, and diphenyl groups and R₂ and R₃ are members of the group consisting of alkyl, benzyl and cyclohexyl groups, said tertiary amine serving during the reaction to combine with the formed hydrohalogenic acid and leave an unreacted portion of the primary amine free for continuation of the condensation, and the solvent serving during the reaction to minimize the formation of a solid form of amine-hydrohalide and to accelerate the rate of condensation.

23. The improved method of making a tertiary amine by condensation of a primary amine of the group consisting of phenyl-, naphthyl- and diphenyl-amines, and a hydrocarbon halide of the group consisting of alkyl-, benzyl- and cyclohexyl-halides, in which condensation two hydrocarbon radicals from the hydrocarbon halide replace the two amino hydrogens of the primary amine with the resulting formation of hydrohalogenic acid, which comprises subjecting said materials to reaction in a mass in the presence of an added amount of the desired tertiary amine, said added amine serving during the reaction to combine with the formed hydrohalogenic acid and leave free an unreacted portion of the primary amine for continuation of the condensation, and also in the presence of an added solvent agent which is an alcohol inert in the process and which has the same hydrocarbon radical as the halide employed, said solvent serving to minimize the formation of a hard solid or cake of amine-hydrohalide, and also to hasten the rate of condensation.

24. The process of making a tertiary amine by condensation of a molar quantity of a primary amine of the group consisting of phenyl-, naphthyl- and diphenyl-amines and at least about two molar quantities of a hydrocarbon halide of the group consisting of alkyl-, benzyl- and cyclohexyl halides in which condensation two hydrocarbon radicals from the halide replace the two amino hydrogens of the primary amine with the resulting formation of hydrohalogenic acid, which comprises subjecting the said proportions of said materials to reaction in a mass in the presence of an added molar quantity of the desired tertiary amine, said added amine serving as an agent to combine with the formed hydrohalogenic acid and to leave free the unreacted portion of the primary or the intermediate secondary amine for continuation of the condensation.

25. The improved procedure for carrying out a reaction which forms a tertiary amine by a relatively slow condensation of one mol of a primary amine of the group consisting of phenyl- naphthyl- and diphenyl-amines, with two mols of a hydrocarbon halide of the group consisting of alkyl-, benzyl- and cyclohexyl-halides, in which condensation two hydrocarbon radicals from the hydrocarbon halide replace the two amino hydrogens of the primary amine with the resulting formation of hydrohalogenic acid, which comprises subjecting said materials to reaction in a mass, interrupting the condensation one or more times, and at each time applying to the reaction mass a solution of a neutralizing inorganic alkali for the hydrohalogenic acid to form an inorganic halide salt in solution, separating the solution from the reacting ingredients, and continuing the reaction, whereby each removal of formed acid hastens the reaction toward completion and renders all the primary amine available for condensation.

26. The process of claim 25 in which an inert solvent material for the primary amine and the halide is present during the condensation whereby the formation of solid amine hydrohalide is such as to facilitate its availability for quick neutralization, and whereby the solvent acts during the condensation to accelerate the condensation.

27. The process of claim 25 in which inert solvent selected from the group consisting of inert hydrocarbons, inert ketones, inert mono and polyhydric alcohols, inert high boiling ethers, excess of the reactive hydrocarbon halide, and neutralizing tertiary amine, is present during the condensation whereby to accelerate the condensation, and whereby to render the formed amine hydrohalide subject more quickly to neutralization by said alkali solution.

28. The process of claim 25 in which a tertiary amine of the group consisting of tertiary amines of the benzene and heterocyclic series is present during the condensation whereby to unite with the hydrohalogen acid and thus free the primary amine and intermediate monosubstituted amine for the condensation.

29. The process of claim 25 in which tertiary amine of the kind to be formed by the condensation is added to be present during the condensation to accelerate the reaction.

30. The process of claim 25 in which an alcohol of the same hydrocarbon as the halide is present as a solvent during the condensation to accelerate the condensation.

31. The process of claim 25 in which during the condensation an alcohol of the same hydrocarbon as the halide is present as a solvent, and a tertiary amine of the kind to be formed by the condensation is present, both to accelerate the condensation.

WALKER M. HINMAN.
WALTER G. HOLLMANN.